US008962537B2

(12) United States Patent
Al-Bagoury et al.

(10) Patent No.: US 8,962,537 B2
(45) Date of Patent: Feb. 24, 2015

(54) OIL WELL DRILLING FLUIDS, OIL WELL CEMENT COMPOSITION AND SLURRY OF WEIGHTING MATERIAL

(75) Inventors: Mohamed Al-Bagoury, Kristiansand S (NO); Christopher Drysdale Steele, Strathkinness Fife (GB)

(73) Assignee: Elkem AS, Oslo (NO)

(*) Notice: Subject to any disclaimer, the term of this patent is extended or adjusted under 35 U.S.C. 154(b) by 0 days.

(21) Appl. No.: 13/695,664

(22) PCT Filed: Nov. 21, 2011

(86) PCT No.: PCT/NO2011/000327
§ 371 (c)(1),
(2), (4) Date: Nov. 1, 2012

(87) PCT Pub. No.: WO2013/009187
PCT Pub. Date: Jan. 17, 2013

(65) Prior Publication Data
US 2014/0155302 A1    Jun. 5, 2014

(30) Foreign Application Priority Data
Jul. 11, 2011  (NO) .................................... 20111012

(51) Int. Cl.
C09K 8/48       (2006.01)
C09K 8/32       (2006.01)
(Continued)

(52) U.S. Cl.
CPC ................ C09K 8/032 (2013.01); C09K 8/145 (2013.01); C09K 8/32 (2013.01); C09K 8/48 (2013.01); C04B 28/04 (2013.01)
USPC ........... 507/271; 507/140; 507/143; 507/269; 166/285; 106/733

(58) Field of Classification Search
None
See application file for complete search history.

(56) References Cited

U.S. PATENT DOCUMENTS 5,919,739 A     7/1999   Sunde et al.
7,449,431 B2 *  11/2008  Bradbury et al. ............. 507/140
(Continued)

FOREIGN PATENT DOCUMENTS

GB    1 495 874 A    12/1977
GB    2 066 876 A     7/1981
(Continued)

OTHER PUBLICATIONS

Office Action issued Feb. 7, 2012 in counterpart Norway Patent Application No. 20111012 (Translation).
(Continued)

Primary Examiner — John J Figueroa
(74) Attorney, Agent, or Firm — Lucas & Mercanti, LLP

(57) ABSTRACT

The present invention relates to oil well drilling comprising a weighting agent consisting of microfine, particulate ilmenite having a $FeTiO_3$ content of at least 85% by weight, a specific surface area (BET) between 1 and 5 $m^2/g$, where 90% by volume of the particles have a size of less than 12.5 µm and a D50 between 3 µm and 6 µm by volume measured by laser diffraction using Malvern laser diffraction particle size analyzer, where the particles have an average circularity of at least 0.85 determined by image analysis. The invention further relates to high density oil well cement slurry comprising water, Portland cement, a to weighting material and optionally silica flour, microsilica, fiber, rubbery particles a fluid loss addition and a retarder, where the weighting material is particulate microfine ilmenite having a $FeTiO_3$ content of at least 85% by weight, a specific surface area (BET) between 1 and 5 $m^2/g$, and where 90% by volume of the particles have a size of less than 12.5 µm and a D50 between 3 and 6 µm measured by laser diffraction using Malvern laser diffraction particle size analyzer, and where the particles have an average circularity of at least 0.85 determined by image analysis. Finally, the invention relates to a slurry of microfine ilmenite.

9 Claims, 3 Drawing Sheets

(51) Int. Cl.
*C09K 8/03* (2006.01)
*C09K 8/14* (2006.01)
*C04B 28/04* (2006.01)

(56) References Cited

U.S. PATENT DOCUMENTS

| | | | |
|---|---|---|---|
| 7,727,939 B2 * | 6/2010 | Bradbury et al. | 507/224 |
| 8,002,049 B2 * | 8/2011 | Keese et al. | 175/64 |
| 2003/0203822 A1 * | 10/2003 | Bradbury et al. | 507/200 |
| 2005/0277551 A1 | 12/2005 | Massam et al. | |
| 2009/0029878 A1 * | 1/2009 | Bicerano | 507/107 |

FOREIGN PATENT DOCUMENTS

| | | |
|---|---|---|
| WO | 85/05118 A1 | 11/1985 |
| WO | 2010/027366 A1 | 3/2010 |

OTHER PUBLICATIONS

Junin, et al., "The use of ilmenite as weighting material in drilling mud," Environemental Issues and Waste Management in Energy and Mineral Production, pp. 415-418 (1998).

Saasen, et al., "Application of Ilmenite as Weight Material in Water Based and Oil Based Drilling Fluids," Proceedings—SPE Annual Technical Conference and Exhibition, pp. 721-725 (2001).

Schaaning, et al., "Metal Partitioning in Ilmenite-and Barite-based Drill Cuttings on Seabed Sections in a Mesocosm Laboratory," SPE Drilling and Completion, vol. 26, No. 2, pp. 268-277 (2011).

Tuntland, et al. "Iron Oxides as Weight Materials for Drilling Mud," Erdoel-Erdgas-Zeitschrift, vol. 97, No. 8, pp. 300-302 (1981).

* cited by examiner

OIL WELL DRILLING FLUIDS, OIL WELL CEMENT COMPOSITION AND SLURRY OF WEIGHTING MATERIAL

This application is a 371 of PCT/NO2011/000327 filed on Nov. 21 2011, which claims priority to and the benefit of Norwegian Application No. NO20111012 filed on Jul. 11 2011, the contents of which are incorporated herein by reference in their entirety.

FIELD OF INVENTION

The present invention relates to oil well drilling fluid compositions, oil well cement compositions and slurry of weighting material for use in oil well drilling, fluids and oil well cement composition.

Background Art

In the exploration for oil and gas both drilling fluids and cement slurries must have the right density to counterbalance the downhole pressure in the formations. Drilling fluids are generally used to serve certain functions such as lifting the cuttings to the earth's surface, lubricating and cooling the drill bit, maintaining the downhole pressure, etc. . . . . There are two major classes of drilling fluids, namely water based (WBM) and non-aqueous based drilling fluids (NAF). Normally water based drilling fluid comprises water as continuous phase together with other additives such as, a viscosity modifier such as clay or organic polymer, shale inhibitor, dispersant and a weighting agent such as brine, or any heavy weight particles with a specific gravity (SG) >2 g/cm$^3$.

One of the main functions of oil well cement compositions is to maintain the well integrity during the well's lifetime which can be more than 30 years. The cement contributes to reduce the risk of uncontrolled flow of oil or gas (provide permeable-zones isolation), provide mechanical support for the casing string, protect casing from corrosion, and support the wellbore walls to prevent collapse of formations. Oil well cements are further used to make permanent or temporary seals (plugs).

Cement slurry comprises mainly Portland cement, water and additives such as dispersant, fluid loss, reducing agents, retarder and others. It may further contain rubbery material or fibers to improve the mechanical properties, and hollow spheres or weighting agents for density optimization.

The commonly used weighting agents for both drilling fluids and cement slurries are barite ($BaSO_4$, SG minimum 4.2), manganese tetraoxide ($Mn_3O_4$, SG 4.7-4.9), calcium carbonate ($CaCO_3$, SG 2.7-2.8), ilmenite ($FeTiO_3$, SG 4.5-4.7), hematite ($Fe_3O_4$, SG 4.9-5.2), galena (PbS, SG 7.4-7.7) and grinded silica ($SiO_2$, SG 2.2-2.3).

Ilmenite, iron titanium oxide ($FeTiO_3$), as a mined mineral was first introduced to oil & gas exploration and production as weighing agent by Titania AS in 1979.

In the paper "Application of ilmenite as weight material in water based and oil based drilling fluids" (SPE 71401) by A. Saasen et al., published for the 2001 SPE Annual Technical Conference and Exhibition in New Orleans 30 Sep.-3 Oct. 2001. The use of ilmenite in water based and oil based drilling fluids is described. The ilmenite used has a D50 of 9.5 μm +/−1.5 μm, with fraction of particles above 45 μm less than 1.5% by weight and fraction of particles below 1 μm less than 10% by weight. The particle size distribution is measured by the sedimentation method using Sedigraph. This gives particle distribution in % by weight. Full scale tests with drilling mud containing ilmenite and barite as weighting agents showed that use of ilmenite instead of barite did not imply increased abrasion. It has however been found that the rheological properties are not satisfactory when using ilmenite with the particle size described by Saasen et al.

In U.S. patent application No. US 2005/0277551 it is disclosed a system for increasing the density of a fluid phase of a drilling fluid by adding a solid phase weighting material having a particle size distribution of at least 50% by weight particles in the range of about 1 μm to about 5 μm and at least 90% by weight particles in the range of 4 μm to 8 μmt. The solid phase material is selected from the group consisting of barite, calcite, hematite, ilmenite or combinations thereof. However all examples are with barite and there is no indication of results obtained by using other weighting material than barite.

DESCRIPTION OF THE INVENTION

According to a first aspect the present invention relates to oil well drilling fluids wherein the oil well drilling fluid comprises a weighting agent consisting of microfine, particulate ilmenite having a $FeTiO_3$ content of at least 85% by weight, a specific surface area (BET) between 1 and 5 m$^2$/g, where 90% by volume of the particles have a size of less than 12.5 μm and a D50 between 3 μm and 6 μm by volume measured by laser diffraction using Malvern laser diffraction particle size analyzer, where the particles have a median high sensitivity circularity (HSCirc.[n,0.5]) of at least 0.85 determined by image analysis using Morphologi®G3 particle characterization system from Malvern® Instruments. The median high sensitivity circularity (HSCirc.[n,0.5]) will hereafter be referred to as average circularity.

Preferably the specific surface of the ilmenite is between 1.5 and 4 m$^2$/g.

The average circularity of the microfine ilmenite particles is preferably at least 0.90.

The circularity as a parameter that describes the particle morphology or shape is determined by the following equation;

$$\text{High Sensitivity (HS) Circularity} = 4\pi A/P^2$$

where A is the particle area and P is its perimeter.

The average circularity of particle can be within the range 0-1, where a perfect circle has circularity of 1 while a very irregular object has circularity closer to 0. Weighting agents with high circularity are desirable for oil well drilling fluids and oil well cement slurries as it enhances the flow properties by means of low rheology and less abrasiveness compared to materials having a similar size but with lower average circularity.

The ilmenite particles used in the present invention is produced by crushing and milling ilmenite mineral having a low content of magnetite and subjecting the milled ilmenite particles to a sedimentation and flotation process in order to remove foreign mineral particles associated with the ilmenite. After drying the ilmenite particles are subjected to further milling and are sieved and classified to obtain the desired particle size distribution and specific surface area.

The particle size of the ilmenite used in the present invention is substantially smaller than the particle size used in Saasen et al. Particle size measurement by laser diffraction using Malvern on the ilmenite used by Saasen et al. showed a D50 of 18 μm.

It has been found that the oil well drilling fluids according to the present invention show very good properties compared to drilling fluids containing coarser ilmenite according to Saasen et al. and according to the use of barite as weighting agents. Thus the sag is substantially improved compared to drilling fluids containing barite and more coarser ilmenite.

Also the plastic viscosity is improved. Ilmenite is an acid soluble mineral. It dissolves in mineral acids such as HCI, $H_2SO_4$ and $H_3PO_4$ and by many organic acids. With the small particle size acid solubility for ilmenite used as weighting material according to the present invention is good. The acid solubility of weighting agents is of great technical importance for drilling fluids, as the mud filter cake formed during the drilling has to be removed before starting producing oil. This is done in a step called well completion. Barite on the other hand is not soluble in acids and is thus difficult to remove from the well. Normally expensive chelating agents like EDTA are used to improve the solubility of barite.

Another advantage of the oil well drilling fluids of the present invention is that ilmenite particles have a good mechanical strength. Thus impact from the drilling bit will not break the ilmenite particles into smaller particles. This is important due to the fact that if the particle size of a drilling fluid changes during the drilling the Theological properties will also change. Barite on the other hand has a low strength and will be broken down to smaller particles during the drilling operation resulting in changing the viscosity of the drilling fluid.

According to another aspect the present invention relates to a high density oil well cement slurry comprising water, Portland cement, silica flour, microsilica, a weighting material and optionally a fluid loss additive and a retarder, wherein the weighting material is particulate microfine ilmenite having a $FeTiO_3$ content of at least 85% by weight, a specific surface area (BET) between 1 and 5 $m^2/g$, and where 90% by volume of the particles have a size of less than 12.5 μm and a D50 between 3 μm and 6 μm measured by laser diffraction using Malvern laser diffraction particle size analyzer, and where the particles have an average circularity of at least 0.85 determined by image analysis.

Preferably the average circularity of the microfine ilmenite particles is at least 0.90.

It has been found that the high density oil well cement slurry according to the present invention containing microfine ilmenite has a low tendency of settling compare to oil well cement slurries using hematite as weighting to the present invention shows improved rheological properties compared to oil well cement therein containing hematite.

The microfine ilmenite used in the oil well drilling fluids and in the oil well cement composition according to the present invention can be added in dry particulate form. For aqueous based drilling fluids and cement composition the microfine ilmenite can also be added in the form of an aqueous slurry.

The present invention therefore also relates to a stable non settling aqueous slurry comprising water, up to 85% by weight microfine ilmenite having a $FeTiO_3$ content of a least at 85% by weight, a specific area (BET) between 1 and 5 $m^2/g$, where 90% by volume of the particles have a size of less than 12.5 μm and a D50 between 3 and 6 μm by volume measured by laser diffraction using Malvern laser diffraction particle analyzer, where the particles have an average circularity of at least 0.85 determined by image analysis and 0.05 to 1% dispersant based on the weight of dry microfine ilmenite selected from an ethoxylated polycarboxylate, polyacrylic aid salt, alkali metal salt of lignosulphonate and biopolymer sulphonated acrylite copolymer and the dispersant having an molecular weight below 50 000 g/mol.

Preferably the microfine ilmenite particles have an average circularity of at least 0.90.

Preferably the dispersant has a molecular weight between 3000 and 20 000 g/mol.

It has been found that the slurry of microfine ilmenite according to the invention is very stable and shows very little settling.

SHORT DESCRIPTION OF DRAWINGS

DETAILED DESCRIPTION OF INVENTION

Example 1

Figure 1:
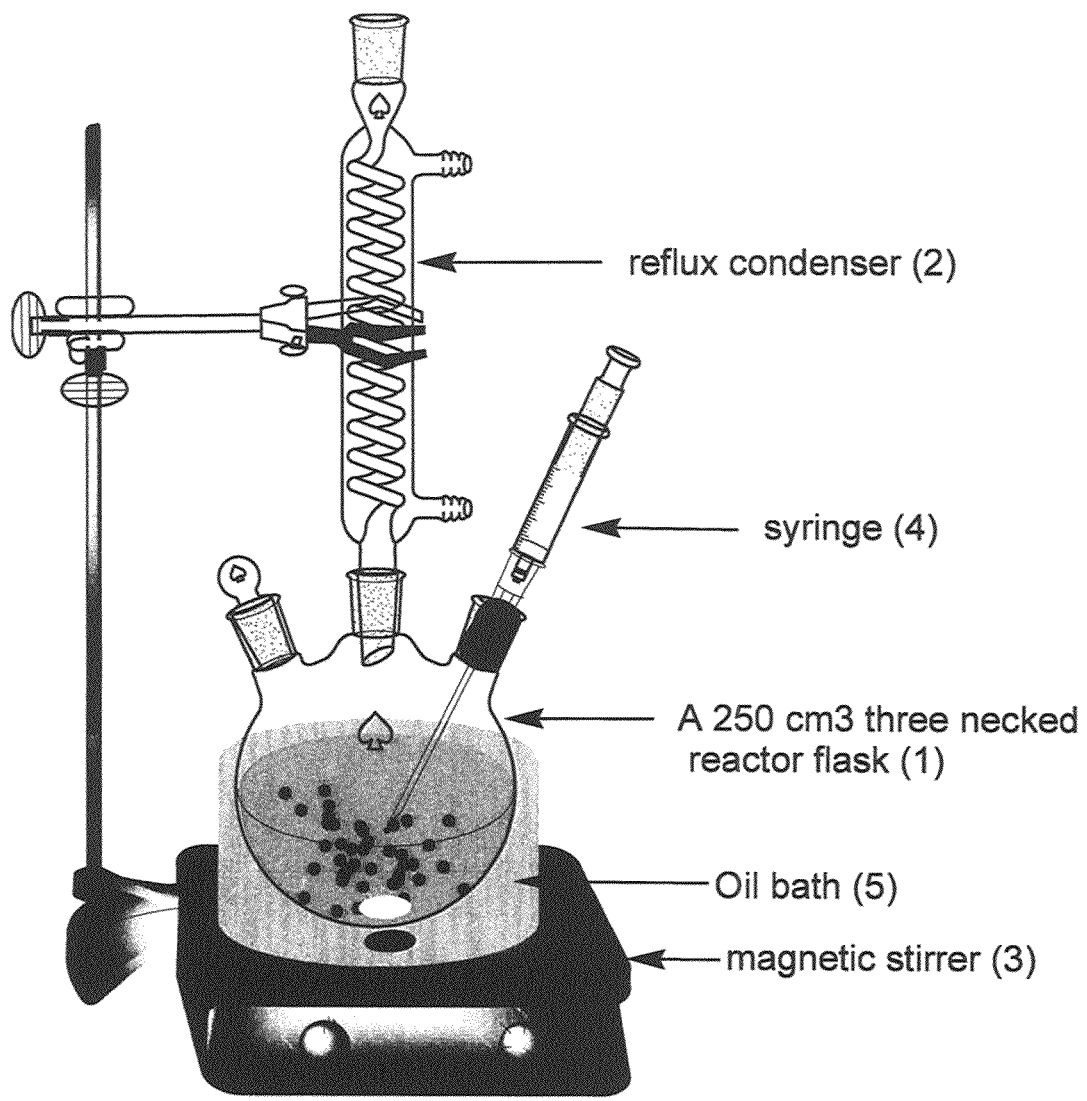
FIG. 1 shows a set-up for testing of acid dissolution of ilmenite.

Oil Based Drilling Fluid.

Oil based drilling fluids with a specific gravity of 2.1 g/ml having the compositions shown in Table 1 were prepared and tested according to the API 13B standard. The drilling fluids in Table 1 were made using the following weighting materials:

1. Microfine ilmenite according to the invention having a D90 of 12.5 μm and a D50 of 5 μm measured by laser diffraction using Malvern laser diffraction particle size analyzer.

2. Ilmenite according to Saasen et al. having a D50 of 18 μm measured by laser diffraction using Malvern laser diffraction particle size analyzer.

3. Standard API barite.

When making the drilling fluid a brine of CaCl2 in water was first prepared and then added to the fluid before adding the weighting agent. A constant speed mix with speed of 6000 rpm was used to prepare the fluids. Mixing time for each additive is shown in Table 1.

TABLE 1

| Chemicals | Mass in (gm) | | | Mixing time (min) |
|---|---|---|---|---|
| Mineral oil | 313.3 | 313.3 | 313.3 | |
| Fatty acid based emulsifier | 18 | 18 | 18 | 5 |
| Amine based wetting agent | 14 | 14 | 14 | 5 |
| Organophilic clay | 1.6 | 1.6 | 1.6 | 10 |
| Lime | 16 | 16 | 16 | 5 |
| Liginite based fluid loss agent | 16.8 | 16.8 | 16.8 | 5 |
| Polymeric fluid loss agent | 7.2 | 7.2 | 7.2 | 5 |
| Dispersant | 2.4 | 2.4 | 2.4 | 5 |
| CaCl2 | 31 | 31 | 31 | 15 |
| Water | 104.5 | 104.5 | 104.5 | |
| Microfine ilmenite (FeTiO3) 5 μm | 1108 | | | 10 |
| Ilmenite (FeTiO3) 18 μm | | 1186 | | 10 |
| Barite (BaSO4) | | | 1277 | 10 |

The properties of the tested drilling fluids are shown in Table 2. The drilling fluids were tested before hot aging (BHR) and after hot aging (AHR).

TABLE 2

TEST RESULTS

|   |   | Ilmenite 5 μm BHR | Ilmenite 5 μm AHR | Ilmenite 18 μm BHR | Ilmenite 18 μm AHR | Barite BHR | Barite AHR |
|---|---|---|---|---|---|---|---|
| TEMPERATURE/° C. | ° C. | 150 | 150 | 150 | 150 | 150 | 150 |
| PERIOD STATIC AGED | Hours |  | 16 |  | 16 |  | 16 |
| RHEOLOGY: Temp/° C. |  | 50 | 50 | 50 | 50 | 50 | 50 |
| 600 rpm |  | 99 | 99 | 83 | 81 | 97 | 100 |
| 300 rpm |  | 51 | 52 | 41 | 42 | 47 | 50 |
| 200 rpm |  | 36 | 38 | 29 | 27 | 34 | 36 |
| 100 rpm |  | 20 | 21 | 16 | 15 | 17 | 19 |
| 6 rpm |  | 3 | 4 | 2 | 2 | 2 | 3 |
| 3 rpm |  | 2 | 4 | 2 | 2 | 2 | 3 |
| Gels 10" | lb/100 ft$^2$ | 5 | 2 | 2 | 3 | 3 | 2 |
| Gels 10' | lb/100 ft$^2$ | 5 | 3 | 2 | 5 | 4 | 2 |
| Plastic Viscosity | cP | 48 | 47 | 42 | 39 | 50 | 50 |
| Yield Point | lb/100 ft$^2$ | 3 | 5 | −1 | 3 | −3 | 0 |
| FILTRATION: Temperature | ° C. | 150 | 150 | 150 | 150 | 150 | 150 |
| HTHP Fluid Loss | mL oil | 20 | 8.8 | 4.4 | 2.4 | 6.8 | 5 |
| Filter cake | mm | Ca 8-9 | Ca 6 | 8 | 7 | 10 |  |
| Measured Density |  |  | 2.05 | 2.08 |  | 2.04 | 2.04 |
| Electrical Stability | Volts | 598 | 545 | 259 | 241 | 669 | 384 |
| SAG TEST Supernatant Liquid | mL |  | 13 |  | 84 |  | 120 |
| Density - Top | g/cm$^3$ |  | 2.05 |  | 1.45 |  | 2.04 |
| Density - Bottom | g/cm3 |  | 2.18 |  | 2.54 |  | 3.06 |
| Sag Factor |  |  | 0.515 |  | 0.636 |  | 0.600 |

It can be seen from Table 2 that even the specific surface area for microfine ilmenite according to the present invention is much higher than for barite, the plastic viscosity (PV) was considerably lower for the oil drilling fluid according to the invention than for the drilling fluid. Also the sag factor was much lower for the drilling fluid containing microfine ilmenite than for the drilling fluid containing barite.

It can further be seen from Table 2 that the microfine ilmenite according to the present invention provides a more stable drilling fluid with a considerably lower sag factor than the drilling fluid containing the more coarse ilmenite with a D50 of 18 μm. The supernatant liquid was lower for the microfine ilmenite according to the invention.

The fluid loss after hot aging of the drilling fluid containing microfine ilmenite according to the invention of 8.8 ml is relatively higher than the desired value of <5 ml. This can be further reduced by increasing the content of the fluid loss agent.

Example 2

Water Based Drilling Fluid.

Water based drilling fluids with a specific gravity of 2.3 g/ml having the composition shown in Table 3 were prepared and tested according to API 13B standard. The drilling fluids in Table 3 were made using microfine ilmenite according to the present invention having a D50 of 5 μmπ measured by laser diffraction using Malvern laser diffraction particle size analyzer and standard API barite as weighting materials. The fluids were mixed using a high shear mixer. The acrylate dispersant is an aqueous solution with an active substance of 40% by weight.

The compositions were subjected to hot aging for 16 hours at 80° C. The rheology was measured using Farm viscometer model 35 at 50° C. and static sag was measured. High pressure high temperature (HPHT) filtration was conducted at 80° C. with a differential pressure of 500 PSI.

TABLE 3

| Material | g | g | Mixing time (min) |
|---|---|---|---|
| Water | 320 | 320 |  |
| Starch | 4 | 4 | 2 |
| KOH | 0.75 | 0.75 | 5 |
| Anionic cellulose | 6 | 6 | 2 |
| KCl | 60 | 60 | 2 |
| Acrylic dispersant | 14 | 14 | 2 |
| Microfine ilmenite 5 μm | 904 |  | 5 |
| Barite |  | 988 | 5 |

As shown in Table 4 the drilling fluid with ilmenite according to the invention showed a lower plastic viscosity than the drilling fluid containing barite. The rheology of the fluids is reduced slightly after hot aging due to thermal and shear degradation. The fluid loss measured at 80° C. for the two drilling fluids in within acceptable range(<15 ml). The drilling fluid containing microfine ilmentite according to the present invention showed much lower sag factor than the drilling fluid containing barite.

TABLE 4

|  |  | Barite | Ilmenite (5 μm) |
|---|---|---|---|
| Temperature | ° C. | 80° C. | 80° C. |
| Period static aged | Hours | 16 | 16 |

TABLE 4-continued

|  |  | Barite |  | Ilmenite (5 μm) |  |
|---|---|---|---|---|---|
| Rheology |  | 50° C. | 50° C. | 50° C. | 50° C. |
| 600 rpm |  | 134 | 112 | 102 | 92 |
| 300 rpm |  | 70 | 58 | 54 | 48 |
| 200 rpm |  | 49 | 40 | 41 | 34 |
| 100 rpm |  | 24 | 19 | 23 | 19 |
| 6 rpm |  | 2 | 2 | 4 | 4 |
| 3 rpm |  | 1 | 1 | 4 | 3 |
| Gels 10" | lb/100 ft² | 1 | 1 | 1 | 1 |
| Gels 10' | lb/100 ft² | 3 | 1 | 3 | 2 |
| Plastic Viscosity | cP | 64 | 54 | 48 | 44 |
| Yield Point | lb/100 ft² | 6 | 4 | 6 | 4 |
| Filtration Temperature | ° C. | 80 | 80 | 80 | 80 |
| HTHP Fluid Loss | mL water | 8.4 | 5.6 | 10.8 | 10 |
| Filter cake | mm | — | <1 | 1 | 2 |
| SAG test Supernatant Liquid | mL |  | — |  | — |
| Density - Top | g/cm³ |  | 1.92 |  | 2.32 |
| Density - Bottom | g/cm³ |  | 2.55 |  | 2.42 |
| Sag Factor |  |  | 0.570 |  | 0.511 |
| pH |  | 9.8 | 9.2 | 9.2 | 9.4 |

Example 3

Water Based Drilling Fluids.

Water based drilling fluid with a specific gravity of 2.1 g/ml suitable for high temperature (>150° C.) application having a composition as shown in Table 5 were prepared and tested according to API 13B standard. The drilling fluids in Table 5 were made using ilmenite according to the invention and ilmenite according to Saasen et al. having a D50 of 18 μm measured by laser diffraction using Malvern laser diffraction particle size analyzer as weighting materials.

TABLE 5

| Chemicals | Mass in (gm) |  | Mixing time (min) |
|---|---|---|---|
| Water | 475.0 | 475.0 |  |
| Clay as viscosifier | 10 | 10 | 5 |
| Caustic Soda | 1.0 | 1.0 | 10 |
| Liginte based fluid loss agent | 9.8 | 9.8 | 5 |
| Synthetic fluid loss agent | 7.8 | 7.8 | 5 |
| HPHT dispersant | 10 | 10 | 2 |
| Ilmenite (5 μm) | 1015 |  | 10 |
| Ilmenite (18 μm) |  | 1015 | 10 |

The properties of the drilling fluids were measured before and after static hot aging for 16 hours at 150° C. The results are shown in Table 6.

TABLE 6

|  |  | Ilmenite (5 μm) |  | Ilmenite (18 μm) |  |
|---|---|---|---|---|---|
| Static hot aging for 16 h |  | BSHA | ASHA 150 C. | BSHA | ASHA 150 C. |
| Rheology at 50 C. |  |  |  |  |  |
| 600 rpm |  | 89 | 96 | 93 | 97 |
| 300 rpm |  | 47 | 54 | 49 | 53 |
| 200 rpm |  | 34 | 40 | 37 | 39 |
| 100 rpm |  | 19 | 20 | 18 | 21 |
| 6 rpm |  | 4 | 4 | 2.5 | 4 |
| 3 rpm |  | 3 | 3 | 2 | 3 |
| Gels 10" | lb/100 ft² | 5 | 3 | 3 | 4 |
| Gels 10' | lb/100 ft² | 4 | 5 | 3 | 3 |
| PV | cP | 42 | 42 | 44 | 44 |
| YP | lb/100 ft² | 5 | 12 | 5 | 9 |
| Static Sag |  |  |  |  |  |
| Supernatant liquid | ml |  | 32 |  | 72 |
| Density top | g/cm3 |  | 2.04 |  | 2.04 |
| Density bottom | g/cm3 |  | 2.25 |  | 2.37 |
| Static Sag Factor |  |  | 0.524 |  | 0.537 |
| pH |  | 9.73 | 9.06 | 8.52 | 8.2 |
| Filtration |  |  |  |  |  |
| Fluid Loss at 150 C. | ml | 38 | 29 | 26 | 24 |
| Filter cake | mm | 10 | 10 | 7 | 6 |

The results in Table 6 further show that ilmenite according to the invention even though it has three times smaller particle size than the ilmenite of 18 μm shows quite similar rheology. Generally one would expect that the rheology to increase as the size of the particles decreases, but this is not the case here. This behaviour can be related to the high circularity of the ilmenite particles according to the present invention. The sedimentation was greatly improved for the drilling fluid according to the invention as shown by the sag factor and the supernatant liquid. The low supernatant value reflects a high stability of the drilling fluid.

Example 4

Acid Solubility of Ilmenite.

In order to test the acid solubility of the microfine ilmenite according to the present invention a set-up as shown in FIG. 1 was used. A 250 cm³ three necked reactor flask 1 equipped with a reflux condenser 2 magnetic stirrer 3 for homogenization and a syringe 4 to draw samples was used. An oil bath 5 with a thermocouple for temperature control was used for heating. A 40.5 g conc. HCl+109.5 g $H_2O$ are poured into the reactor 1 and heated using a thermostatically controlled heater 6 to 100° C. After reaching the desired temperature 7.5 g ilmenite sample were added. Samples of 2 ml after a certain time intervals showed below using a syringe 4 were taken. Samples were cooled down and 1 ml of filtrated solution (0.45 μm filter) was poured into 100 ml flask and diluted with distilled water. The dissolved Mg, Si, Fe and Ti content were analyzed using atomic absorption spectroscopy method (ASS). Samples were taken at the following time intervals: 5, 10, 15, 30, 60, 90, 180 and 240 min.

To demonstrate the effect of ilmenite size on the dissolution rate three different grades ilmenite with an average size (D50) of 5, 18 and 70 μm were tested. The solubility of ilmenite was tested at 100° C. in two media with different HCI concentrations by means of 10 and 20 wt% by the weight of solution, respectively. In the 20 wt% solution additional 0.5 mol methanol was added to enhance the solubility as reported in literature.

Solution I (10% HCI i.e. 2.83 mol/l)

40.5 g conc HCI (37%)+109.5 g water+7.5 g ilmenite

Solution II (20% HCI i.e. 5.9 mol/l)

81 g conc. HCI (37%)+66 g water+3 g methanol+7.5 ilmenite

Figure 2:
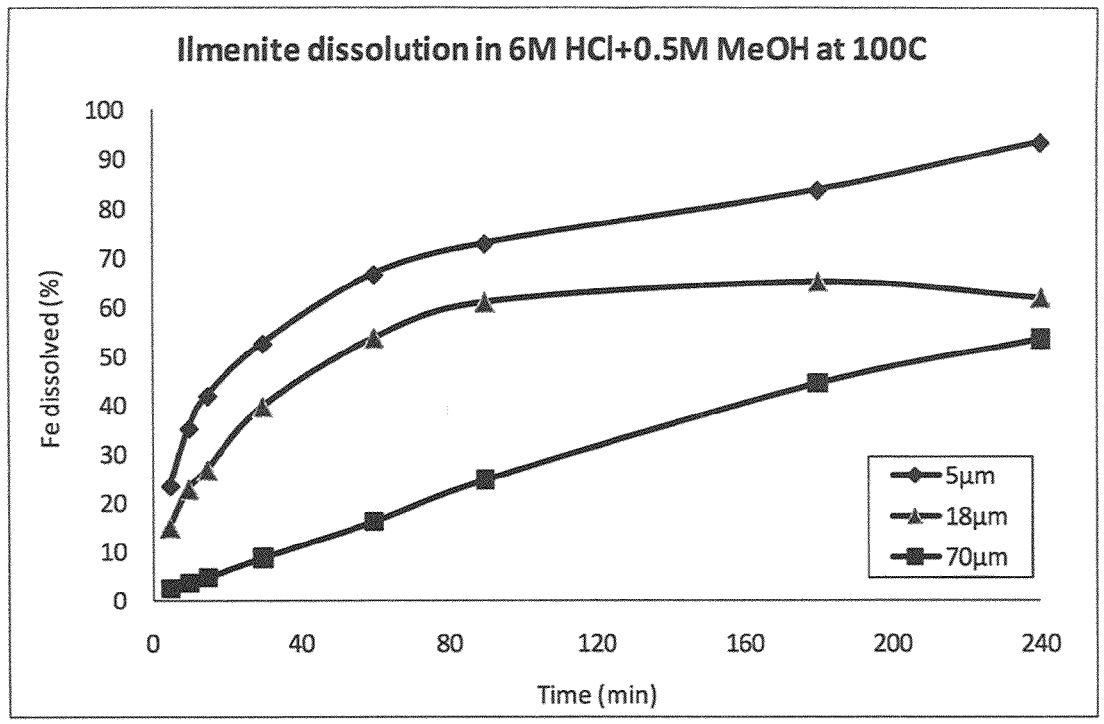
FIG. 2 shows a diagram for ilmenite dissolution versus time in 6 M HCI+0.5 M methanol at 100° C.
Figure 3:
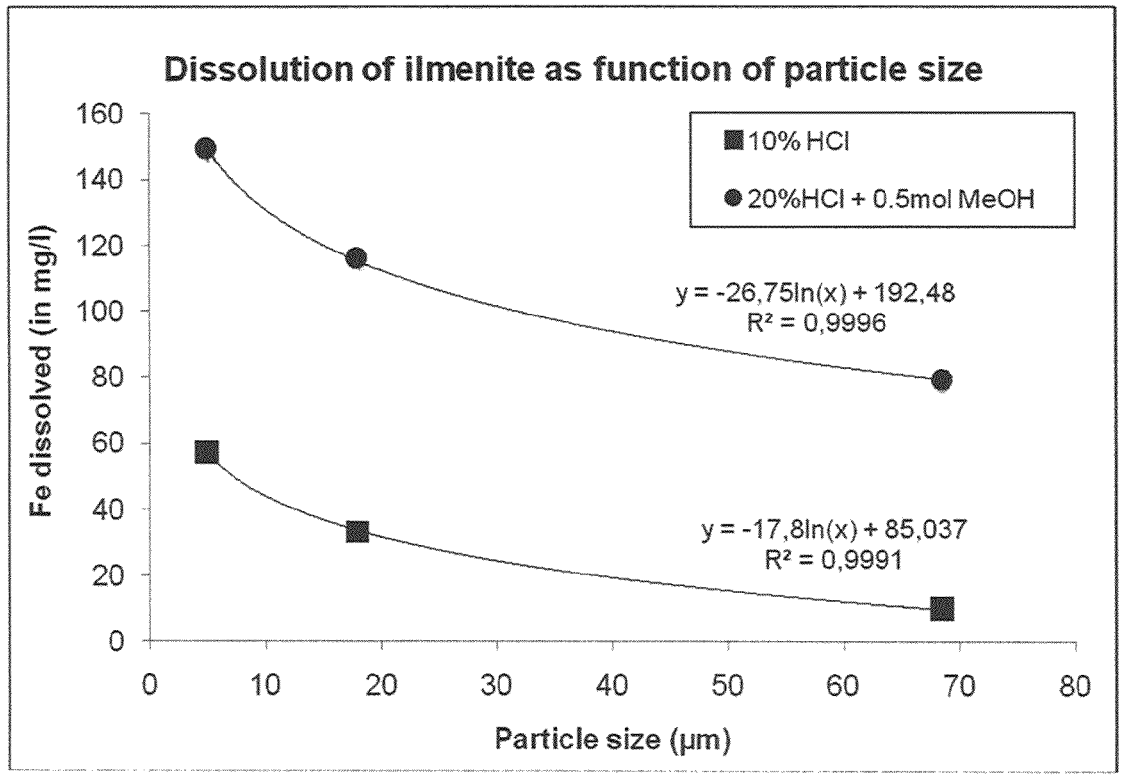
FIG. 3 shows a diagram for ilmenite dissolution as a function of particle size.
Figure 4:
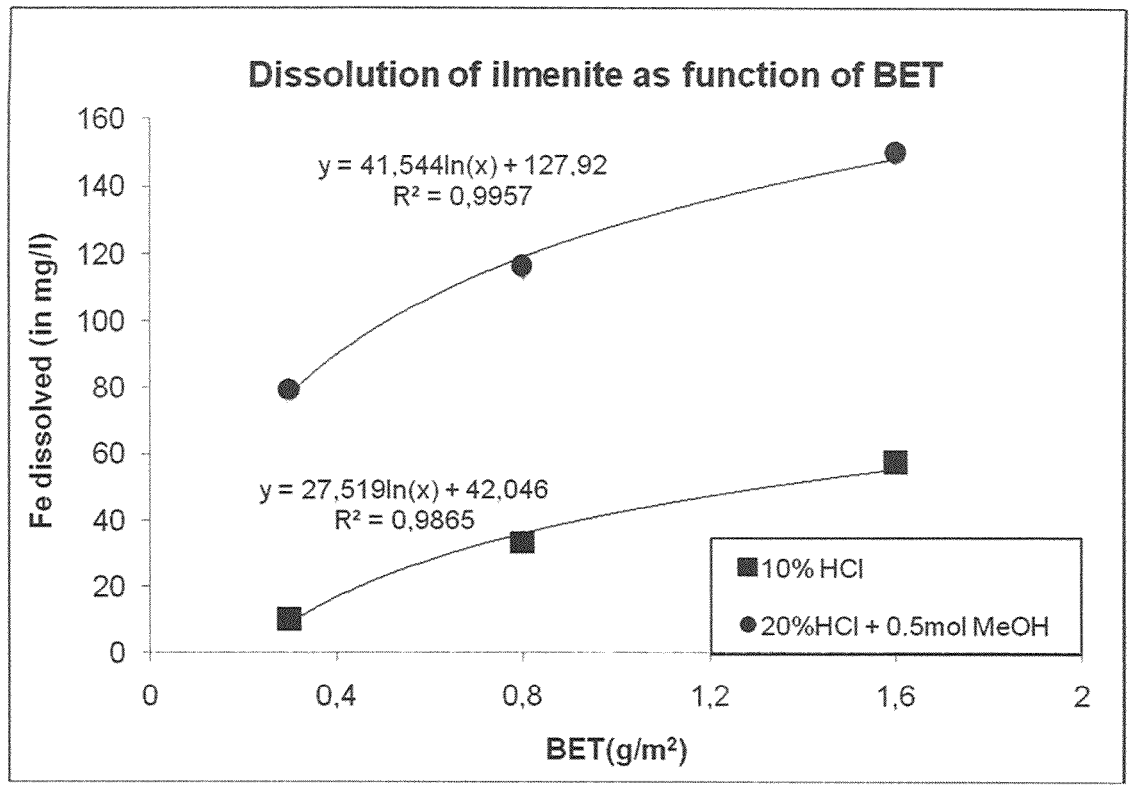
FIG. 4 shows a diagram for ilmenite dissolution as a function of BET surface area.

The diagrams in FIG. 2-4 below show the ilmenite solubility in the two solutions after 180 min. The dissolution is given as Fe in mg/l. It is clear from the diagrams in FIGS. 2 and 3 that the dissolution rate is proportional to the size. The dissolved Fe is in a logarithmic relation to the particle size or the surface area as shown in FIG. 4. Practically this means by using this microfine ilmenite (D50=<5 μm and D90 <15 μm) in drilling fluids according to the invention the filter cake removal by acid dissolution will be much faster than the ilmenite grade existing today on the market (D50=ca. 15 μm). This will save time when performing completion job.

Example 5

Flowability of Microfilm Ilmenite.

The powder flow of the microfine ilmenite with D50 of 3.7 μm and D50 of 5 μm and BET of 1.9 and 1.6 m²/g respectively were tested using a ring shear tester RST-XS from Dr. Dietmar Schulze Schüttgutmesstechnik, as a well known technique for powder flow characterization. For comparison purpose the powder flow of barite with D50 of 15 μm and ilmenite with D50 of 18 μm were tested. As shown in Table 7 microfine ilmenite showed good flow function coefficient (FFC) value at a consolidation pressure of 20000 Pa. The classification of flowability of powders by FFC is as follows:

FFC<1—not flowing

1<FFC<2—very cohesive

2<FFC<4—cohesive

4<FFC<10—good flowing

10<FFC—free flowing

TABLE 7

| Material | FFC Consolidation pressure (20000 Pa) |
|---|---|
| Barite (D50 = 15 μm) | 2.98 |
| Microfine Barite | 2.19 |
| Ilmenite (D50 = 18 μm) | 6.58 |
| Ilmenite (D50 = 5 μm) | 5.71 |
| Ilmenite (D50 = 3.7 μm) | 4.05 |

Such FFC data suggest that ilmenite with D50 of ca. 5 μm and 3.7 μm should be easily to transport pneumatically without the need for granulating the powder.

Example 6

Oil Well Cement.

Three oil well cement compositions were containing three different weighting materials to produce cement slurries with a specific gravity of 2.22 g/ml. The composition of the oil well cement slurries are shown in Table 8.

TABLE 8

| Chemiclas | Mass in (gm) | | |
|---|---|---|---|
| | Micromax | Hematite | Ilmenite |
| Fresh water | 260 | 260 | 260 |
| G-Cement | 522 | 522 | 522 |
| Silica flour | 183 | 183 | 183 |
| Dispersant | 25 | 25 | 25 |
| Fluid loss agent | 5 | 5 | 5 |
| Retarder | 2 | 2 | 2 |
| Antifoam | 0.92 | 0.92 | 0.92 |
| Micromax | 308 | | |
| Hematite | | 302 | |
| Ilmenite | | | 330 |

As shown in Table 8 the following three weighting materials were used:
1. Microfine ilmenite according to the invention with a D50 of 5 μm and D90 of 12.5 μm.
2. Hematite is an API grade with D50 of 20 μm.
3. Manganomanganic oxide from Elkem AS sold under trademark MICROMAX.

The cement slurries were prepared and tested according to API 10A protocol. The following equipment was used to prepare and test the cement slurries:

Farm 35 rheometer and pressure filtration system for measuring fluid loss at HTHP.

Constant-speed waving mixer 250 and 500 ml not aging cell

The results of the tests are shown in Table 9.

TABLE 9

| Cement system | Readings of Fann viscometer in rpm at 60° C. | | | | | | PV | YP | FW | Fluid loss | Filter cake |
|---|---|---|---|---|---|---|---|---|---|---|---|
| | 300 | 200 | 100 | 60 | 30 | 3 | cp | lbs/100 ft2 | ml | ml (60° C.) | mm (ca) |
| Micromax | 47 | 31 | 16 | 10 | 5 | 0.5 | 46.5 | 0.5 | 0 | 41 | 23 |
| Ilmenite | 120 | 73 | 30 | 16 | 7 | 1 | 135 | −15 | 0 | 41 | 30 |
| Hematite | 238 | 162 | 71 | 36 | 15 | 1.5 | 250.5 | −12.5 | 1 | 37 | 30 |

As can be seen from Table 9 the cement slurry containing microfine ilmenite has a considerably lower rheology than the cement slurry containing hematite. A large settling was observed for the cement slurry containing hematite and the amount of free water was higher compare to that for the cement slurry containing ilmenite or micromax. This settling may cause inhomogeneity in the cured cement. The use of microfine ilmenite has overcome this problem. As can be seen from Table 9 the cement slurry containing microfine ilmenite did not show any free water and thus also shows a lower settling tendency than the cement slurry containing hematite.

Figure 5:
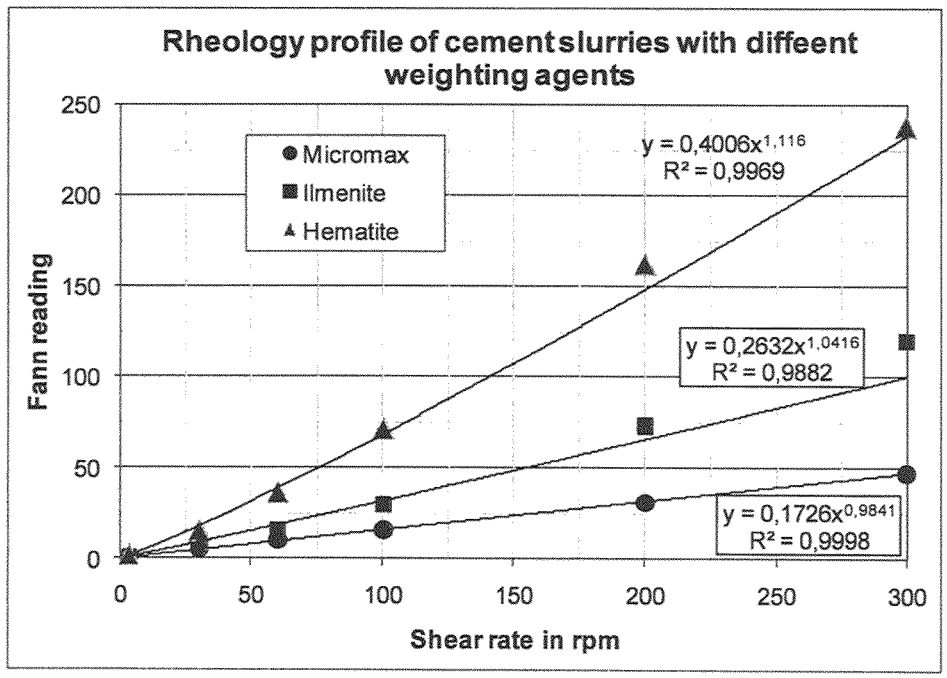
FIG. 5 shows rheology profiles for cement slurries containing different weighting materials.

FIG. 1 shows the rheology profile for the three cement slurries. As can be seen the cement slurry according to the present invention containing microfine ilmenite showed low plastic viscosity compared to the cement slurry containing hematite but quite higher than that for the cement slurry containing manganomanganic oxide. The negative yield point (YP) data is not logic and it means that the commonly Bingham plastic model used for calculation the PV and YP is not suitable for such cement system and applying the non-linear model such as Herschel-Bulkley model will fit better as shown in FIG. 5.

Example 7

Slurry of Microfine Ilmenite.

4 slurries containing ultrafine ilmenite according to the invention. The slurries contained about 80% by weight of ultrafine ilmenite and different dispersant. The composition and the pH and the viscosity of the slurries are shown in Table 10.

TABLE 10

| Slurry Nr. | Dispersant | | pH | Viscosity at shear rate of 20 S$^{-1}$ (mPa·s) | Solid content (%) |
|---|---|---|---|---|---|
| | Type | concentration in (wt %) by the weight of ilmenite | | | |
| 1 | Calcium lignosulphonate (Ufoxane 3A) | 0.8 | 7.75 | 187 | 80.05 |
| 2 | biopolymer sulphonated acrylate copolymer (Alcoflow 880) | 0.35 | 6.26 | 607 | 80.04 |
| 3 | Polyether carboxylate (Castment FS20) | 0.8 | 4.84 | 1193 | 80.03 |
| 4 | Polyacrylic acid (Antiprex A) | 0.8 | 7.2 | 890 | 80.1 |

As can be seen from Table 10 the viscosity of the slurries is good and within the pumpable range.

The invention claimed is:

1. Oil well drilling fluids characterized in that the oil well drilling fluid comprises a weighting agent consisting of microfine, particulate ilmenite having a FeTiO$_3$ content of at least 85% by weight, a specific surface area (BET) between 1 and 5 m$^2$/g, where 90% by volume of the particles have a size of less than 12.5 μm and a D50 between 3 μm and 6 μm by volume measured by laser diffraction using Malvern laser diffraction particle size analyzer, where the particles have an average circularity of at least 0.85 determined by image analysis.

2. Oil well drilling fluids according to claim 1, characterized in that the microfine ilmenite has a specific surface area between 1.5 and 4 m$^2$/g.

3. Oil well drilling fluids according to claim 1, characterized in that the ilmenite particles have an average circularity of at least 0.90.

4. A high density oil well cement slurry comprising water, Portland cement, a weighting material and optionally silica flour, microsilica, fiber, rubbery particles a fluid loss addition and a retarder, characterized in that the weighting material is particulate microfine ilmenite having a FeTiO$_3$ content of at least 85% by weight, a specific surface area (BET) between 1 and 5 m$^2$/g, and where 90% by volume of the particles have a size of less than 12.5 μm and a D50 between 3 and 6 μm measured by laser diffraction using Malvern laser diffraction particle size analyzer, and where the particles have an average circularity of at least 0.85 determined by image analysis.

5. Cement slurry according to claim 4, characterized in that the microfine ilmenite has a specific surface area between 1.5 and 4 m$^2$/g.

6. Cement slurry according to claim 4, characterized in that the ilmenite particles have a circularity of at least 0.90.

7. A stable non settling aqueous slurry, characterized in that the slurry comprises water, up to 85% by weight microfine ilmenite having a FeTiO$_3$ content of a least at 85% by weight, a specific area (BET) between 1 and 5 m$^2$/g, where 90% by volume of the particles have a size of less than 12.5 μm and a D50 between 3 and 6 μm by volume measured by laser diffraction using Malvern laser diffraction particle analyzer, where the particles have an average circularity of at least 0.85 determined by image analysis and 0.05 to 1% dispersant based on the weight of dry microfine ilmenite selected from an ethoxylated polycarboxylate, polyacrylic aid salt, alkali metal salt of lignosulphonate and biopolymer sulphonated acrylite copolymer the dispersant having an molecular weight below 50 000 g/mol.

8. Slurry according to claim 7, characterized in that the dispersant has a molecular weight between 3000 and 20 000 g/mol.

9. Slurry according to claim 7, characterized in that the microfine ilmenite particles have an average circularity of at least 0.90.

* * * * *